May 9, 1950  W. E. TURNER  2,506,848
NUT SHELLER

Filed April 9, 1946  2 Sheets-Sheet 2

W.E.Turner
INVENTOR.

BY Almond Co.
ATTORNEYS.

Patented May 9, 1950

2,506,848

UNITED STATES PATENT OFFICE 2,506,848

NUT SHELLER

William E. Turner, San Antonio, Tex., assignor to Leon K. Maulsby, San Antonio, Tex.

Application April 9, 1946, Serial No. 660,720

2 Claims. (Cl. 146—11)

My present invention relates to an improved nut sheller and more particularly to a device for breaking shells and meats into desired and selected sizes for further treatment as separation of nuts and shells.

According to my invention, cracked nuts with the meats still in the shells are fed into the device and the cracked nuts are batted by ribbed rollers to break the shells and meats whereupon the broken pieces are classified and subjected to further batting if necessary.

A further novel feature of the invention is the provision of progressively increasing force to which the cracked nuts are subjected in the passage through the machine of my invention whereby the nuts first receive a relatively gentle stroke and if not properly cracked are subjected to a stroke of increasing intensity.

In the accompanying drawings I have illustrated one complete example of the physical embodiment of my invention according to the best mode I have thus far devised but it will be understood that various changes and alterations may be made in the exemplified structure within the scope of the appended claims.

Figure 1:
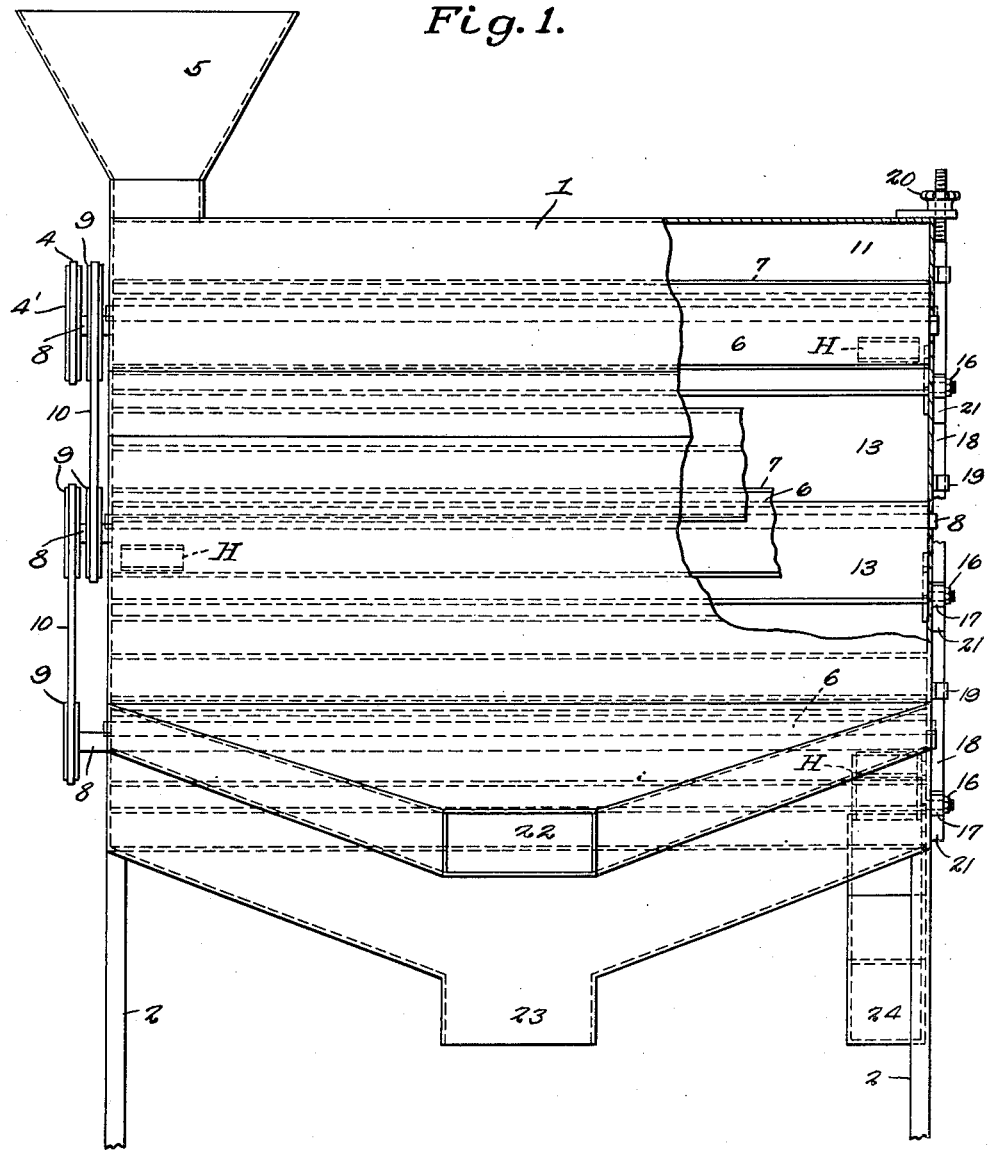
Figure 1 is a side elevational view partially in section showing the nut sheller of my invention.

Referring now to the drawings in detail wherein like numerals indicate like parts, I have illustrated a housing 1 for the nut sheller comprising preferably sheet metal walls and having supporting legs 2. An operating motor 3 of conventional size and suitable design is provided with a belt drive 4 attached in driving relation with the main pulley wheel 4'.

Above the housing 1 and suitably secured thereto I provide the feed chute 5 into which the cracked shells are fed. The nuts in the shell may be cracked by any suitable means or any desirable process.

Within the housing I employ a series, shown as three, of nut-breaking members or rollers 6 having longitudinally extending spaced ribs 7 thereon. These rollers are vertically aligned, and are supported upon, and rotated by the axles 8 suitably and operatively connected with the driven pulley wheels 9 and the driving belts 10 all of which are operably associated with the drive pulley 4' and the motor 3.

The pulley wheels 9 as indicated are progressively smaller in diameter from the top roller to the bottom roller by which decrease in diameter, the lower roller rotates at a greater speed than the one above.

The purpose of this construction is to provide a stroke of increasing force when the ribs bat the cracked shells as will be further described hereinafter.

Figure 2:
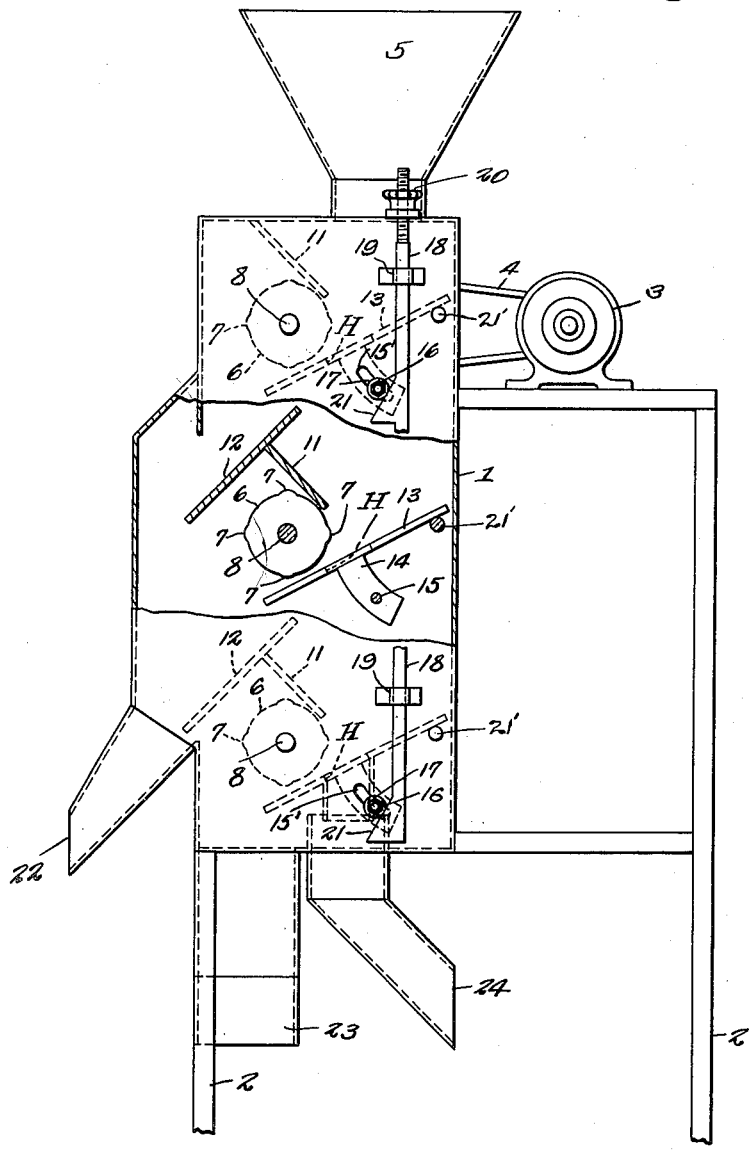
Figure 2 is an end elevational view of the nut sheller also partially in section.

Deflector plates 11 extend diagonally downward from left to right in Figure 2 and these plates prevent uncracked shells from passing through the discharge means until they reach the proper size. The plates 11 extend longitudinally of the device above and tangential to the circumference of the rollers.

Discharge plates 12 are shown as extending at right angles to the deflector plates 11, and these discharge plates direct the properly sized shells and meats to the outlet ports.

Adjustable selector plates 13 are positioned tangentially of the circumference of the rollers and under the rollers in spaced relation through which space properly sized nuts and shells may be discharged. The selector plates are formed with depending arcuate ears 14 and these plates and their ears are maintained in adjusted relation by means of bolts 15 extending through slots 15' in the housing 1, and nuts for the bolts indicated as at 16. Sleeves 17 removably and rotatably carried by the bolts provide easy adjustment through the cam rod 18 journaled exterior of the housing 1 as at 19 and provided with an upper adjustment nut 20. If it is desired that different adjustments be provided as to the various plates, rollers of differing diameters would be used. The cam rod 18 is formed with cam lugs 21 for engagement with the sleeves to move each selector plate with relation to its roller to determine the proper clearance between the roller and the selector plate.

The selector plates are rigid, along their rear longitudinal edges, with shafts 21', that have their ends journaled in the opposed ends of the housing 1, the shafts serving as pivots for the respective plates. Each plate is fashioned with an opening H therein. The openings in the successive plates are at opposite ends thereof in order that the cracked shells and meats may not pass to the next lower roller until they have negotiated the passage from one end of a roller to the other end and been subjected to the continuous batting from the ribs on the rotating rollers.

Outlet chutes 22 and 23 are provided for the discharge of properly broken shells and meats, and a further discharge chute 24 is provided for rejects or uncracked shells which discharge through the opening H of the lowermost roller and plate.

In operation the cracked shells and meats are fed into the hopper or chute 5 and drop onto the rotating roller immediately below. The nuts are directed to the surface of the selector plate, the plate thus constituting a floor for nuts acted on by the particular roller, and move downwardly thereon toward the rotating roller with the ribs. The ribs strike the nuts and drive them away, breaking some and having no effect on others. As the nuts on that plate move from left to right in Figure 1 toward the opening H the nuts broken into suitable size will fall by gravity through the space between the plate and the roller ribs. These properly sized nuts will be directed by the discharge plate 12 to the outlet 22.

The nuts passing the entire length of the roller without being properly broken will fall through the opening H at the right end of the plate in Figure 1 onto the next roller and selector plate where they will pass from left to right in Figure 1 following the same course. Some will be broken and will fall through the space between the roller and the plate and others will continue to the hole H and the process will be repeated.

As stated above the lower rollers rotate at a greater speed and therefore strike the nuts with greater force so that by the time the nuts have traveled the entire course they should be properly sized. However, some nuts which are not properly cracked will not be shelled, and will not break, and these nuts will be discharged from the hole H in the bottom plate into the discharge chute 24.

Having thus fully described my invention, what I claim as new and desire to secure by Letters Patent is:

1. In a nut sheller a housing; vertically spaced ribbed rollers rotatably mounted therein and constituting nut breaking members; means for driving the rollers; vertically spaced floor plates each pivotally mounted along one longitudinal edge thereof between the walls of the housing, the other longitudinal edge of each floor plate extending under each roller and being swingable toward and away from the underside of the roller to adjust the space between each floor plate and roller for the passage of shelled nuts; means for simultaneously adjusting said floor plates relative to the respective rollers different distances from said rollers; deflector plates mounted above and tangential to the rollers and positioned to deflect gravitating nuts to be shelled to the floor plates; said floor plates having end openings for permitting unshelled nuts to gravitate to the rollers next below; discharge plates mounted above all but the uppermost roller, one longitudinal edge of each discharge plate extending under the free swinging edge of each floor plate next above to receive shelled nuts gravitating from the floor plate, said edge of the discharge plate extending beyond and over a portion of each deflector plate to prevent said shelled nuts from gravitating to the next floor plate below; and discharge chutes on the housing positioned to receive shelled nuts gravitating from the discharge plates.

2. In a nut sheller a housing; vertically spaced ribbed rollers rotatably mounted therein and constituting nut breaking members; means for driving the rollers; vertically spaced floor plates each pivotally mounted along one longitudinal edge thereof between the walls of the housing, the other longitudinal edge of each floor plate extending under each roller and being swingable toward and away from the underside of the roller to adjust the space between each floor plate and roller for the passage of shelled nuts; means for simultaneously adjusting said floor plates relative to the respective roller different distances from said rollers; deflector plates mounted above and substantially tangential to the rollers and positioned to deflect gravitating nuts to be shelled to the floor plates; a bypass at the end of each upper roll and floor plate for permitting unshelled nuts to gravitate to the roller and floor plate next below; a bypass at the end of the lowest roll for oversize nuts discharged therefrom, discharge plates mounted between adjacent rollers, one longitudinal edge of each discharge plate extending under the free swinging edge of each floor plate next above to receive shelled nuts gravitating from the said floor plate; and a discharge chute on the housing positioned to receive shelled nuts gravitating from the discharge plates.

WILLIAM E. TURNER.

REFERENCES CITED

The following references are of record in the file of this patent:

UNITED STATES PATENTS

| Number | Name | Date |
|---|---|---|
| 147,301 | Banker | Feb. 10, 1874 |
| 160,618 | Rudy | Mar. 9, 1875 |
| 549,575 | Linn et al. | Nov. 12, 1895 |
| 655,162 | Poorbaugh | July 31, 1900 |
| 1,022,655 | Brine | Apr. 9, 1912 |
| 2,005,758 | Shiley | June 25, 1935 |
| 2,135,393 | Fisher | Nov. 1, 1938 |
| 2,279,987 | Guerra | Apr. 14, 1942 |